United States Patent
Mutalik et al.

(10) Patent No.: US 9,792,187 B2
(45) Date of Patent: Oct. 17, 2017

(54) FACILITATING TEST FAILOVER USING A THIN PROVISIONED VIRTUAL MACHINE CREATED FROM A SNAPSHOT

(71) Applicant: Actifio, Inc., Waltham, MA (US)

(72) Inventors: Madhav Mutalik, Southborough, MA (US); Srikanth Palaparthi, Waltham, MA (US)

(73) Assignee: Actifio, Inc., Waltham, MA (US)

( * ) Notice: Subject to any disclaimer, the term of this patent is extended or adjusted under 35 U.S.C. 154(b) by 83 days.

(21) Appl. No.: 14/705,740

(22) Filed: May 6, 2015

(65) Prior Publication Data

US 2015/0324260 A1 Nov. 12, 2015

Related U.S. Application Data

(60) Provisional application No. 61/989,155, filed on May 6, 2014.

(51) Int. Cl.
| | | |
|---|---|---|
| *G06F 9/455* | (2006.01) | |
| *G06F 11/14* | (2006.01) | |
| *G06F 11/20* | (2006.01) | |

(52) U.S. Cl.
CPC ...... *G06F 11/1484* (2013.01); *G06F 9/45558* (2013.01); *G06F 11/1451* (2013.01); *G06F 11/1469* (2013.01); *G06F 11/203* (2013.01); *G06F 11/202* (2013.01); *G06F 2009/45562* (2013.01); *G06F 2009/45575* (2013.01); *G06F 2009/45591* (2013.01); *G06F 2201/815* (2013.01); *G06F 2201/84* (2013.01)

(58) Field of Classification Search
CPC ............ G06F 9/45558; G06F 9/45562; G06F 9/45575; G06F 2201/84; G06F 2009/45591
See application file for complete search history.

(56) References Cited

U.S. PATENT DOCUMENTS

| | | |
|---|---|---|
| 4,626,829 A | 12/1986 | Hauck |
| 5,381,545 A | 1/1995 | Baker et al. |
| 5,410,667 A | 4/1995 | Belsan et al. |
| 5,497,483 A | 3/1996 | Beardsley et al. |

(Continued)

OTHER PUBLICATIONS

International Search Report and Written Opinion issued by the U.S. Patent and Trademark Office as International Searching Authority for PCT/US12/49174 dated Feb. 8, 2013 (9 pages).

(Continued)

*Primary Examiner* — Joseph Schell
(74) *Attorney, Agent, or Firm* — Wilmer Cutler Pickering Hale and Dorr LLP

(57) ABSTRACT

Systems and methods for facilitating test failover on a remote virtual machine without creating a full copy of the remote virtual machine. A snapshot is created of a remote virtual machine disk, the remote virtual machine disk protecting a source virtual machine disk. An instant, thin provisioned virtual machine is created from the snapshot, and the instant, thin provisioned virtual machine is powered on based on a received instruction to power on the instant, thin provisioned virtual machine thereby creating a running instance of a virtual machine, thereby facilitating test failover on the remote virtual machine without creating a full copy of the remote virtual machine.

20 Claims, 5 Drawing Sheets

(56) References Cited

U.S. PATENT DOCUMENTS

| | | | |
|---|---|---|---|
| 5,535,381 A | 7/1996 | Kopper | |
| 5,819,292 A | 10/1998 | Hitz et al. | |
| 5,828,876 A | 10/1998 | Fish et al. | |
| 5,857,208 A | 1/1999 | Ofek | |
| 5,963,962 A | 10/1999 | Hitz et al. | |
| 6,065,018 A | 5/2000 | Beier et al. | |
| 6,081,875 A | 6/2000 | Clifton et al. | |
| 6,119,208 A | 9/2000 | White et al. | |
| 6,131,148 A | 10/2000 | West et al. | |
| 6,148,412 A | 11/2000 | Cannon et al. | |
| 6,163,856 A | 12/2000 | Dion et al. | |
| 6,192,444 B1 | 2/2001 | White et al. | |
| 6,199,146 B1 | 3/2001 | Pence | |
| 6,202,071 B1 | 3/2001 | Keene | |
| 6,212,531 B1 | 4/2001 | Blea et al. | |
| 6,226,759 B1 | 5/2001 | Miller et al. | |
| 6,269,381 B1 | 7/2001 | St. Pierre et al. | |
| 6,269,431 B1 | 7/2001 | Dunham | |
| 6,324,548 B1 | 11/2001 | Sorenson | |
| 6,330,614 B1 | 12/2001 | Aggarwal et al. | |
| 6,434,681 B1 | 8/2002 | Armangau | |
| 6,460,055 B1 | 10/2002 | Midgley et al. | |
| 6,484,186 B1 | 11/2002 | Rungta | |
| 6,487,561 B1 | 11/2002 | Ofek et al. | |
| 6,557,089 B1 | 4/2003 | Reed et al. | |
| 6,625,704 B2 | 9/2003 | Winokur | |
| 6,654,772 B1 | 11/2003 | Crow et al. | |
| 6,654,912 B1 | 11/2003 | Viswanathan et al. | |
| 6,665,815 B1 | 12/2003 | Goldstein et al. | |
| 6,668,264 B1 | 12/2003 | Patterson et al. | |
| 6,772,302 B1 | 8/2004 | Thompson | |
| 6,779,094 B2 | 8/2004 | Selkirk et al. | |
| 6,823,336 B1 | 11/2004 | Srinivasan et al. | |
| 6,823,436 B2 | 11/2004 | Krishnamurthy | |
| 6,850,929 B2 | 2/2005 | Chang et al. | |
| 6,898,688 B2 | 5/2005 | Martin et al. | |
| 6,915,397 B2 | 7/2005 | Lubbers et al. | |
| 6,928,526 B1 | 8/2005 | Zhu et al. | |
| 6,948,039 B2 | 9/2005 | Biessener et al. | |
| 6,957,362 B2 | 10/2005 | Armangau | |
| 7,072,916 B1 | 7/2006 | Lewis et al. | |
| 7,143,251 B1 | 11/2006 | Patterson | |
| 7,222,194 B2 | 5/2007 | Kano et al. | |
| 7,325,111 B1 | 1/2008 | Jiang | |
| 7,346,623 B2 | 3/2008 | Prahlad et al. | |
| 7,386,695 B2 | 6/2008 | Fuente | |
| 7,428,657 B2 | 9/2008 | Yamasaki | |
| 7,647,355 B2 | 1/2010 | Best et al. | |
| 7,689,633 B1 | 3/2010 | Li et al. | |
| 7,707,184 B1 | 4/2010 | Zhang et al. | |
| 7,814,128 B2 | 10/2010 | Silvers et al. | |
| 7,937,547 B2 | 5/2011 | Liu et al. | |
| 8,037,032 B2 | 10/2011 | Pershin et al. | |
| 8,139,575 B2 | 3/2012 | Biran et al. | |
| 8,150,808 B2 | 4/2012 | Zha et al. | |
| 8,161,077 B2 | 4/2012 | Zha et al. | |
| 8,180,740 B1 | 5/2012 | Stager et al. | |
| 8,180,742 B2 | 5/2012 | Claudatos et al. | |
| 8,299,944 B2 | 10/2012 | Provenzano | |
| 8,346,718 B2 | 1/2013 | Hall et al. | |
| 8,402,004 B2 | 3/2013 | Provenzano et al. | |
| 8,407,191 B1 | 3/2013 | Nanda | |
| 8,468,174 B1 | 6/2013 | Yueh et al. | |
| 8,548,944 B2 | 10/2013 | Yueh | |
| 8,566,361 B2 | 10/2013 | Zha et al. | |
| 8,706,833 B1 | 4/2014 | Bergant et al. | |
| 8,726,273 B2 * | 5/2014 | Le | G06F 9/5077 718/1 |
| 8,751,462 B2 | 6/2014 | Huang et al. | |
| 8,788,769 B2 | 7/2014 | Abercrombie et al. | |
| 8,874,863 B2 | 10/2014 | Mutalik et al. | |
| 9,098,432 B1 | 8/2015 | Bachu et al. | |
| 2002/0129214 A1 | 9/2002 | Sarkar | |
| 2003/0101321 A1 | 5/2003 | Ohran | |
| 2003/0140070 A1 | 7/2003 | Kaczmarski et al. | |
| 2004/0172411 A1 | 9/2004 | Herre et al. | |
| 2004/0199570 A1 | 10/2004 | Terao | |
| 2005/0066095 A1 | 3/2005 | Mullick et al. | |
| 2005/0165794 A1 | 7/2005 | Mosescu | |
| 2006/0074945 A1 | 4/2006 | Mori | |
| 2006/0212704 A1 | 9/2006 | Kirovski et al. | |
| 2007/0097959 A1 | 5/2007 | Taylor | |
| 2007/0130188 A1 | 6/2007 | Moon et al. | |
| 2009/0049260 A1 | 2/2009 | Upadhyayula | |
| 2009/0204649 A1 | 8/2009 | Wong et al. | |
| 2009/0222496 A1 | 9/2009 | Liu et al. | |
| 2010/0122052 A1* | 5/2010 | Waldspurger | G06F 11/1438 711/162 |
| 2010/0122248 A1* | 5/2010 | Robinson | G06F 9/485 718/1 |
| 2011/0040819 A1 | 2/2011 | Li et al. | |
| 2011/0184919 A1 | 7/2011 | Shirk | |
| 2011/0218966 A1 | 9/2011 | Barnes et al. | |
| 2011/0258161 A1 | 10/2011 | Constantinescu et al. | |
| 2011/0258239 A1 | 10/2011 | Petrocelli | |
| 2012/0123406 A1 | 5/2012 | Edmunds et al. | |
| 2012/0123999 A1 | 5/2012 | Ashutosh et al. | |
| 2012/0124012 A1 | 5/2012 | Provenzano et al. | |
| 2012/0124013 A1 | 5/2012 | Provenzano | |
| 2012/0124014 A1 | 5/2012 | Provenzano | |
| 2012/0124046 A1 | 5/2012 | Provenzano | |
| 2012/0124105 A1 | 5/2012 | Provenzano | |
| 2012/0124306 A1 | 5/2012 | Abercrombie et al. | |
| 2012/0124307 A1 | 5/2012 | Ashutosh et al. | |
| 2012/0151482 A1* | 6/2012 | Lee | G06F 9/45558 718/1 |
| 2012/0323926 A1 | 12/2012 | Nath et al. | |
| 2013/0006943 A1 | 1/2013 | Chavda et al. | |
| 2013/0036098 A1 | 2/2013 | Mutalik et al. | |
| 2013/0054523 A1 | 2/2013 | Anglin et al. | |
| 2013/0054524 A1 | 2/2013 | Anglin et al. | |
| 2013/0238572 A1 | 9/2013 | Prahlad et al. | |
| 2013/0318053 A1 | 11/2013 | Provenzano et al. | |
| 2013/0346803 A1* | 12/2013 | Chiruvolu | G06F 11/3688 714/37 |
| 2015/0178108 A1* | 6/2015 | Tarasuk-Levin | G06F 9/45558 718/1 |

OTHER PUBLICATIONS

Alapati, "NetApp Technical Report: SnapMirror Sync and SnapMirror Semi-Sync Overview and Design Considerations," NetApp, Jul. 2010 (24 pages).

American Megatrends, Inc., "StorTrends/ManageTrends (Version 2.7) User's Guide for the StorTends 1300 Storage Appliance" Mar. 23, 2009 (378 pages).

Arrell et al., "Using RVA and SnapShot for Business Intelligence Applications with OS/390 and DB2," IBM, Redbooks, Aug. 1998 (70 pages).

Azagury et al., "Point-in-Time Copy: Yesterday, Today and Tomorrow," IBM Research Lab in Haifa, No Date Listed (pp. 259-270).

Baird, "Virtual Storage Architecture Guide (VSAG)," IEEE, No Month Listed 1995 (pp. 312-326).

Baker, "Disk-Based Mirroring is a Lot More Than Just Safe," Computer Technology Review, No Month Listed 2000 (pp. 55-57).

Brown et al., "SnapMirror and SnapRestore: Advances in Snapshot Technology," retrieved online at [URL:<<https://web.archive.org/web/2011126183455/http://www.netapp.com/tech_library/3043.html>>] No Date Listed (13 pages).

Cederqvist et al., "Version Management with CVS," No Month Listed 1992 (122 pages).

Chang et al., "Performance Analysis of Two Frozen Image Based Backup/Restore Methods," IEEE International Conference on Electron Information Technology 2005, May 22-25, 2005 (7 pages).

Chapman et al., "SnapMirror® Best Practices Guide," Network Appliance, Inc., Apr. 2006 (63 pages).

Chatterjee et al., "Efficient Replication Leveraging Information Lifecycle Management in Data Storage Systems," Provisional Patent Application No. Not Available, Feb. 9, 2009 (25 pages).

(56) References Cited

OTHER PUBLICATIONS

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).
Chutani et al., "The Episode File System," Usenix Association, Proceedings of the Winter 1992 Usenix Conference, San Francisco, California, Jan. 20-24, 1992 (19 pages).
CommVault, "CommVault® Simpana® Quick Recovery® Software for Critical Data Center Applications and File Systems," No Month Listed 2010 (35 pages).
Dantz Development Corporation, "Retrospect® User's Guide," No Month Listed 2002 (262 pages).
Degwekar, "Using SnapMirror® with SnapDrive® for Unix®," No Month Listed 2007 (11 pages).
Delphix Corp.'s Invalidity Contentions Under Patent L.R. 3-3, Jul. 24, 2014 (27 pages).
Edwards et al., "FlexVol: Flexible, Efficient File Volume Virtualization in WAFL," Usenix Association, Usenix '08: 2008 Usenix Annual Technical Conference, No Month Listed 2008 (pp. 129-142).
You et al., "Deep Store: An Archival Storage System Architecture," Proceedings of the 21st International Conference on Data Engineering, No Month Listed 2005 (12 pages).
Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).
EMC, "Backup of Oracle in EMC Symmetrix Environments with EMC NetWorker PowerSnap," Aug. 2008 (25 pages).
Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("the '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("the '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).

(56) References Cited

OTHER PUBLICATIONS

Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).

(56) References Cited

OTHER PUBLICATIONS

Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, No Date Listed (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™ . . . Innovation Instant Solutions," Innovation Data Processing, No Date Listed (2 pages).

Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror® : File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).

(56) References Cited

OTHER PUBLICATIONS

Vmware, "Vmware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).

\* cited by examiner

US 9,792,187 B2

FACILITATING TEST FAILOVER USING A THIN PROVISIONED VIRTUAL MACHINE CREATED FROM A SNAPSHOT

RELATED APPLICATIONS

This application relates to and claims priority under 35 U.S.C. §119(e) to U.S. Provisional Patent Application No. 61/989,155, titled "Methods and apparatus for replicated data test failover," which is filed on May 6, 2014 and is hereby incorporated by reference herein in its entirety.

FIELD

The subject matter disclosed in this application generally relates to computerized methods and computer apparatus for test failover of replicated data.

BACKGROUND

Traditionally, validating data on a virtual machine involved making a full copy of the virtual machine. Making a full copy of the virtual machine to validate the contents takes a long time and can defeat the purpose of validation.

SUMMARY

Systems and methods are disclosed for facilitating test failover on a remote virtual machine without creating a full copy of the remote virtual machine. In some embodiments, the systems and methods comprise transmitting an instruction, by a computing device, to a remote hypervisor to create a snapshot of a remote virtual machine disk, the remote virtual machine disk protecting a source virtual machine disk. In some embodiments, protecting the source virtual machine disk comprises receiving, by the computing device, data indicative of a full backup of a source virtual machine disk, the source virtual machine disk including data corresponding to the source virtual machine and an associated source virtual machine metadata; and creating from the full backup, by the computing device, the remote virtual machine and a remote virtual machine disk including data from the source virtual machine. In some embodiments, the systems and methods disclosed herein further comprise transmitting a second instruction, by the computing device, to the remote hypervisor to create an instant, thin provisioned virtual machine from the snapshot, wherein creating the instant, thin provisioned virtual machine from the snapshot further comprises creating a copy-on-write reference virtual disk from the snapshot, the copy-on-write reference virtual disk including a reference to the remote virtual machine disk; and transmitting a third instruction, by the computing device, to the remote hypervisor to power on the instant, thin provisioned virtual machine based on a received instruction to power on the instant, thin provisioned virtual machine thereby creating a running instance of a virtual machine, thereby facilitating test failover on the remote virtual machine without creating a full copy of the remote virtual machine.

In some embodiments, protecting the source virtual machine disk further comprises updating, by the computing device, the remote virtual machine disk during a subsequent backup with deduplicated data, the deduplicated data associated with data corresponding to the source virtual machine disk at a first point time that is different than data corresponding to a the source virtual machine disk at a prior point in time.

In some embodiments, the snapshot comprises a copy of a state of the remote virtual machine disk at a time corresponding to a prior successful replication.

In some embodiments, the systems and methods disclosed herein further comprise transmitting an instruction, by the computing device, to the remote hypervisor to store modifications made to the remote virtual machine after creating the snapshot to delta files such that the newer modification do not affect the contents of the remote virtual machine disks. In some embodiments, the delta files include references to the remote virtual machine disks.

In some embodiments, the systems and methods described herein further comprise transmitting an instruction, by the computing device, to the remote hypervisor to catalog, by the computing device, an instant, thin provisioned virtual machine image corresponding to the instant, thin provisioned virtual machine when the instant, thin provisioned virtual machine is powered on such that the user or the computing device can identify the instant, thin provisioned virtual machine image.

In some embodiments, the systems and methods described herein further comprise receiving an instruction, by the computing device, to delete data associated with the instant, thin provisioned virtual machine, wherein deleting the data associated with the instant, thin provisioned virtual machine comprises identifying the instant, thin provisioned virtual machine image corresponding to the instant, thin provisioned virtual machine data. In some embodiments, creating the instant, thin provisioned virtual machine comprises creating instant, thin provisioned virtual machine using an application programming interface. In some embodiments, the systems and methods described herein are used for disaster recovery.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

DESCRIPTION

Figure 1:
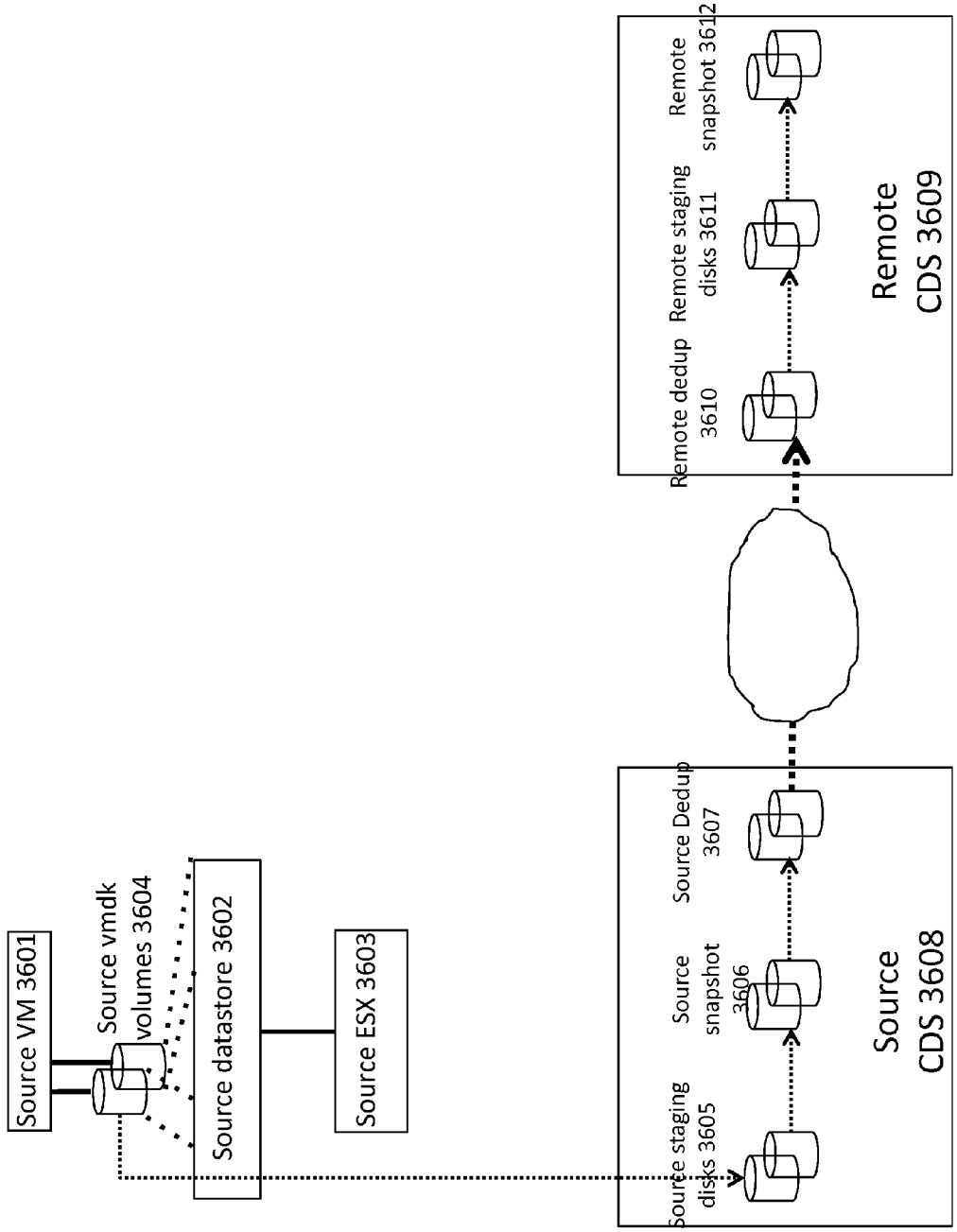
FIG. 1 is an exemplary diagram of a replication process to a remote performance pool in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

The techniques described herein provide for a test failover capability when using virtual machine metadata (e.g., datastores). These and other capabilities of the disclosed subject matter will be more fully understood after a review of the following figures and detailed description. It is to be understood that the phraseology and terminology employed herein are for the purpose of description and should not be regarded as limiting.

Test failover can refer to a capability that allows quick validation of replicated data for a virtual machine without disrupting the forward replication of the virtual machine. The replicated data can be used for emergency failovers of the virtual machine. Deduplicated asynchronous replication of virtual machines can be performed to two different target types—Remote performance pools (referred as ReadyVolume replication in this document) and Remote Virtual Machine datastores. For example, if using VMWare ESX the replication can be performed to Remote ESX datastores (referred as ReadyVM replication in this document).

A remote performance pool is, for example, a storage pool within a Copy Data Storage (CDS) System at the remote side, so a ReadyVolume replication creates a replicated copy of a source virtual machine in the remote CDS. In case of ReadyVM, for example, a source virtual machine is replicated to disks of a pre-created virtual machine at the remote side and underlying disks of the remote virtual machine are located in datastores accessible from an ESX host. These datastores could reside on disks outside storage pools managed by the CDS.

For performing validation of replicated data, it is often desirable for a test failover operation to be quick and non-disruptive so that it allows forward replication to proceed despite test failover being performed on the application.

Previous techniques validated readyvm replicated data by creating a full clone of the pre-created remote VM that was used as replication target. Based on the size of the virtual machine, this operation could take a very long time making it impractical to use this as a solution to validate the data.

Using the techniques described herein, test failover support is provided to automatically create an instant, thin provisioned virtual machine (hereinafter also referred to as "linked clone") that creates an instant copy of the pre-created remote VM from the last replicated state of the source virtual machine without disrupting forward replication and in a quick and efficient manner. A full clone is an independent copy of a virtual machine that does not share anything with the parent virtual machine, once the cloning process is complete. A linked clone is a dependent copy that shares virtual disks with the parent virtual machine in an ongoing manner. Since linked clone references the virtual disks of the parent virtual machine, it must have access to the parent virtual machine disks.

FIG. 1 illustrates an exemplary diagram of a replication process from a local site to a remote site, such as a remote performance pool (e.g., a ReadyVolume) in accordance with some embodiments.

Source VM 3601 is the source virtual machine being replicated, with its volumes 3604 coming from source datastore 3602. Source datastore 3602 is one type of source virtual machine metadata. Source ESX 3603 is a hypervisor (e.g., ESX) hosting this VM. ESX is a vmware hypervisor that manages physical hardware resources and provides virtual resources for guest virtual machines running on it. Virtual backup appliances are described in more detail in U.S. application Ser. No. 14/491,240, titled "Improved Data Replication System," filed Sep. 19, 2014, the contents of which are incorporated herein in its entirety.

As part of the replication process, data can move between various tiers of storage in source content data storage ("CDS") 3608 as shown in FIG. 1 (e.g., snapshots, deduplicated snapshots, etc.). Source staging disks 3605 maintains a current copy of the source VM by copying modified extents from the source VM 3601 in each replication cycle (e.g., hourly, daily, and/or however configured by the system). In some embodiments, as part of each incremental replication cycle, CDS receives a list of changed blocks (e.g., extents) from a source virtual machine using APIs (e.g., provided by VMWare). It copies only these modified blocks from source virtual machine into the staging disks in CDS. Once the copy from the source vmdk volumes 3604 to the source staging disks 3605 is complete, a copy-on-write snapshot of source staging disks 3605 is created as source snapshot 3606 (e.g., to be used as a reference for future replication cycles). Source snapshot 3606 is deduplicated and unique blocks are stored in source deduplicated storage 3607. In some embodiments, the source snapshot 3606 and the source dedup 3607 are a backup of the source VM 3601.

Unique blocks that are not already present at the remote dedup pool 3610 are sent over the network (e.g., a cloud network) to remote dedup pool 3610 located in remote CDS 3609. Since deduplicated storage (e.g., remote dedup 3610) usually does not maintain data in a readily restorable format, these objects are rehydrated (e.g., expanded from the deduplicated data into a full-fledged/expanded staging disk) for quick access into remote staging disk 3611 that resides in a performance storage pool of remote CDS 3609. A copy-on-write snapshot of 3611 is created as remote snapshot 3612 to be used as a reference of point-in-time copy of the source virtual machine 3601. Details of the newly created snapshot and the linked clone are cataloged in the CDS database as a reference for cleaning them up in future as part of delete test failover operation.

Figure 2:
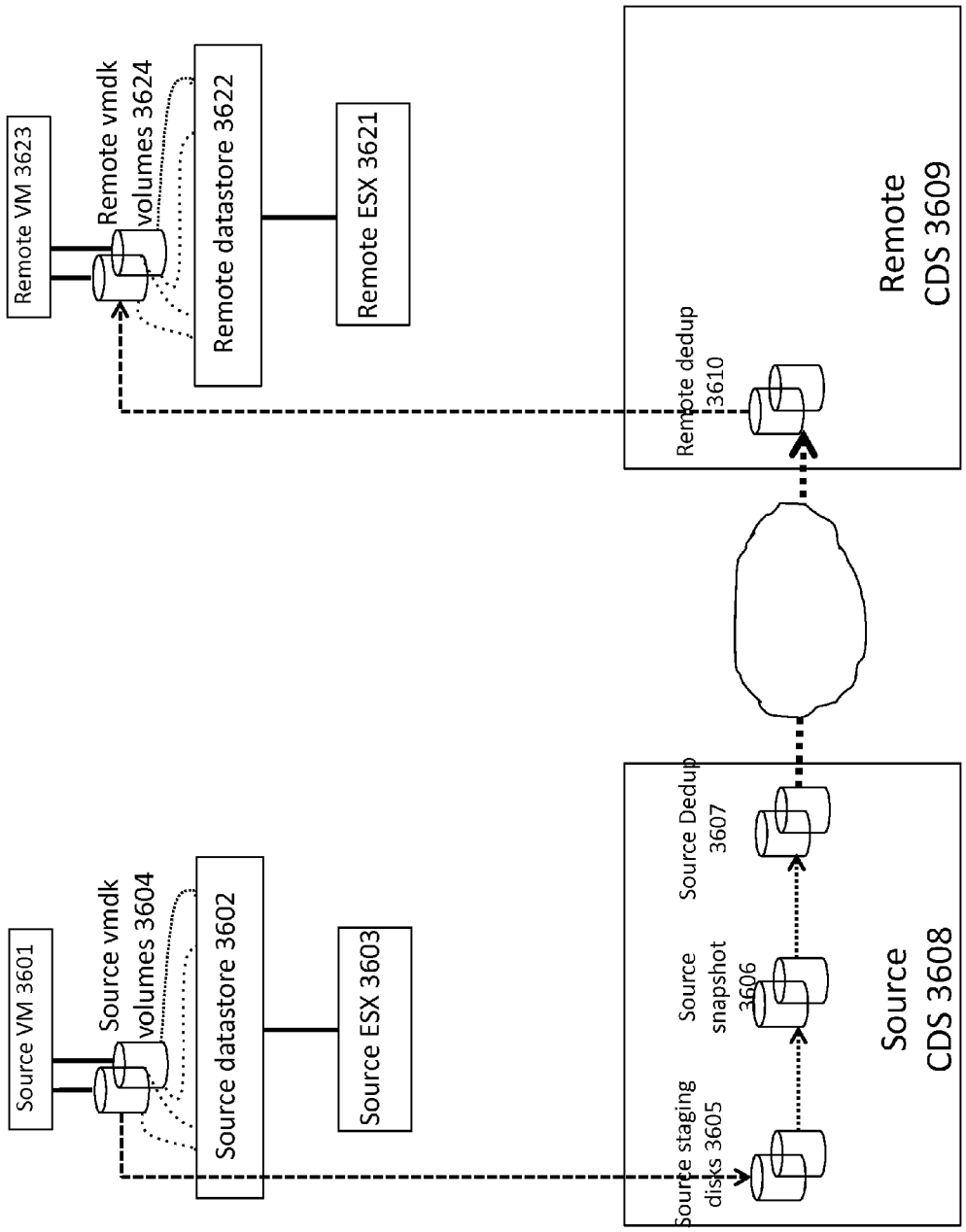
FIG. 2 is an exemplary diagram of a replication process to a remote virtual machine datastore in accordance with some embodiments.

FIG. 2 is an exemplary diagram of a replication process to a remote virtual machine datastore (e.g., ReadyVM) in accordance with some embodiments.

Source VM 3601 is the source virtual machine being replicated, with its volumes 3604 coming from source datastore 3602. Source ESX 3603 is the ESX hosting this VM. Source staging disks 3605 maintains a current copy of the source VM by copying modified extents from the source VM 3601 in each replication cycle. Once the copy from the source vmdk volumes 3604 to the source staging disks 3605 is complete, a copy-on-write snapshot of source staging disks 3605 is created as source snapshot 3606 (e.g., to be used as a reference for future replication cycles). Source snapshot 3606 is deduplicated and unique blocks are stored in source deduplicated storage 3607. Unique blocks that are not already present at the remote dedup pool 3610 are sent over the network (e.g., a cloud network) to remote dedup pool 3610 located in remote CDS 3609. The target used for creating readily accessible objects from 3601 varies, as explained further below.

As part of pre-replication activity, a remote VM 3623 can be created with a similar layout as source VM 3601, as replication target, with remote ESX 3621 and remote datastores 3622 (e.g., which can be configured by a user). In some examples, at this point there is no data in the remote VM 3623 after the initial creation. During replication, data is copied from remote dedup storage 3610 into the remote vmdk volumes 3624 of the remote VM 3623. The term "vmdk" refers to the virtual machine disk file which can be synonymous to a real physical disk for a physical server. In the case of a virtual machine, these can be just files residing in the datastore but presented as disks to the virtual machine. At the end of each replication cycle, remote VM 3623 reflects exact point in time state of the source virtual machine 3601, when replication was started.

In the first replication of the initial data from the remote dedup 3610 to the remote VM 3623, instead of saving the data as actual disks, the data is populated into the remote VMDK volumes 3624 (e.g., by rehydrating the data into the remote vmdk volumes 3624). In subsequent replications, incremental changes are applied to the remote VM 3623. In some embodiments, for populating remote virtual machine with the changes, a snapshot of the remote virtual machine is created using APIs and the changed extents are rehydrated and copied to the snapshot. Once the copy is complete, the remote virtual machine is reverted back from this snapshot. At the end of this operation, the snapshot and remote virtual machine have the same contents.

Figure 3:
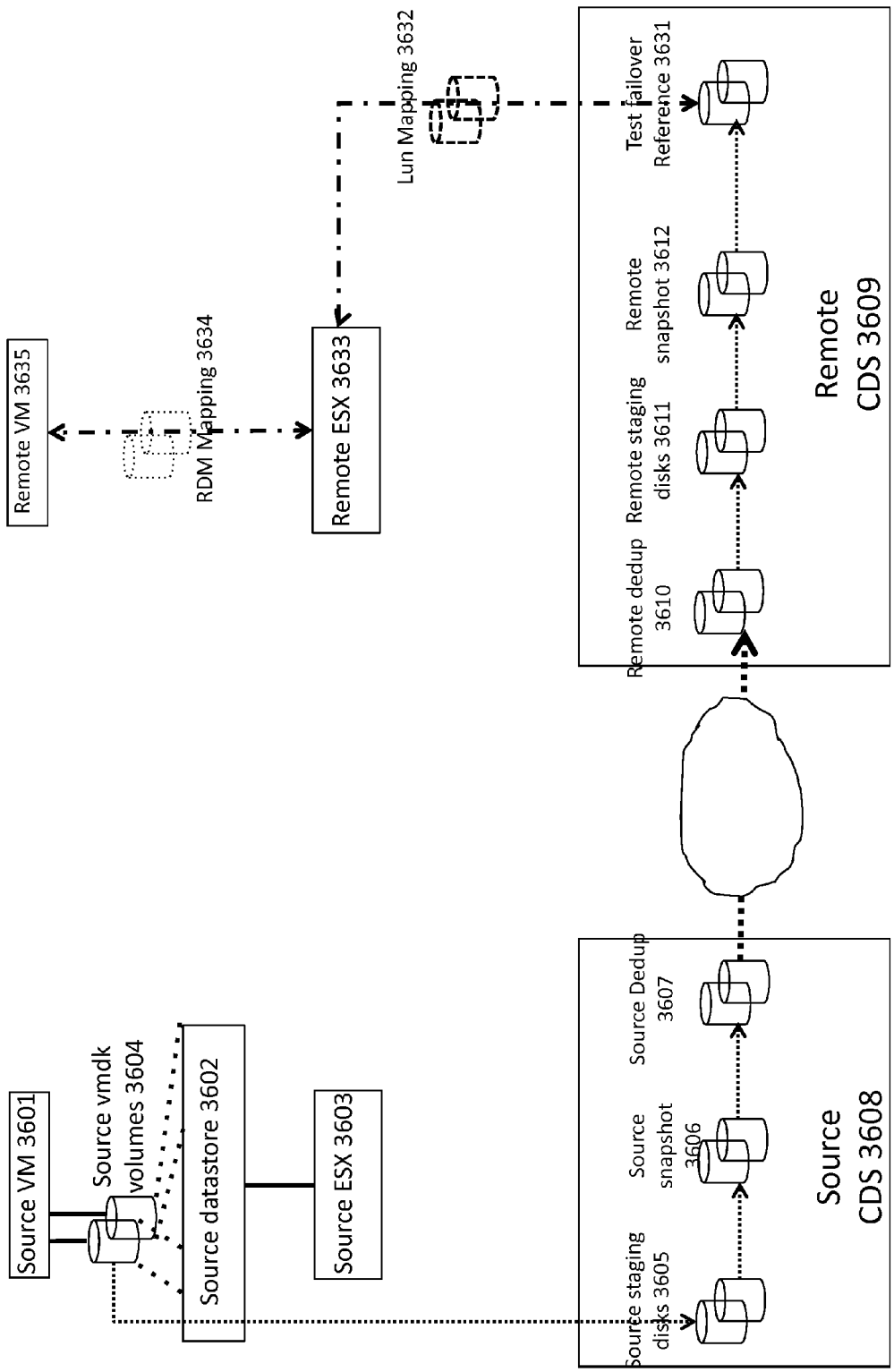
FIG. 3 is an exemplary diagram of a test failover process for remote performance pool replication in accordance with some embodiments.

FIG. 3 is an exemplary diagram of the test failover process for remote performance pool (e.g., readyvolume) replication in accordance with some embodiments. In some examples, the remote snapshot 3612 exists, and it is desirable to check the remote snapshot 3612 to confirm it is ready for use (e.g., for disaster recovery).

A test failover reference copy-on-write copy 3631 is created from the last replicated snapshot 3612. In some embodiments, the copy 3631 is a think copy of 3612 (e.g., where remote snapshot 3612 is a thin copy of remote staging disks 3611). The test failover reference 3631 is mapped to the remote ESX host 3633 (e.g., such that there is no data copy). The newly presented disks 3632 at remote ESX 3633 are then mapped using raw device mapping technology to the remote VM 3635. The Remote VM 3635 now could scan and access the virtual devices 3634 backed by the underlying real test failover reference disks 3631 at the remote CDS 3609.

Figure 4:
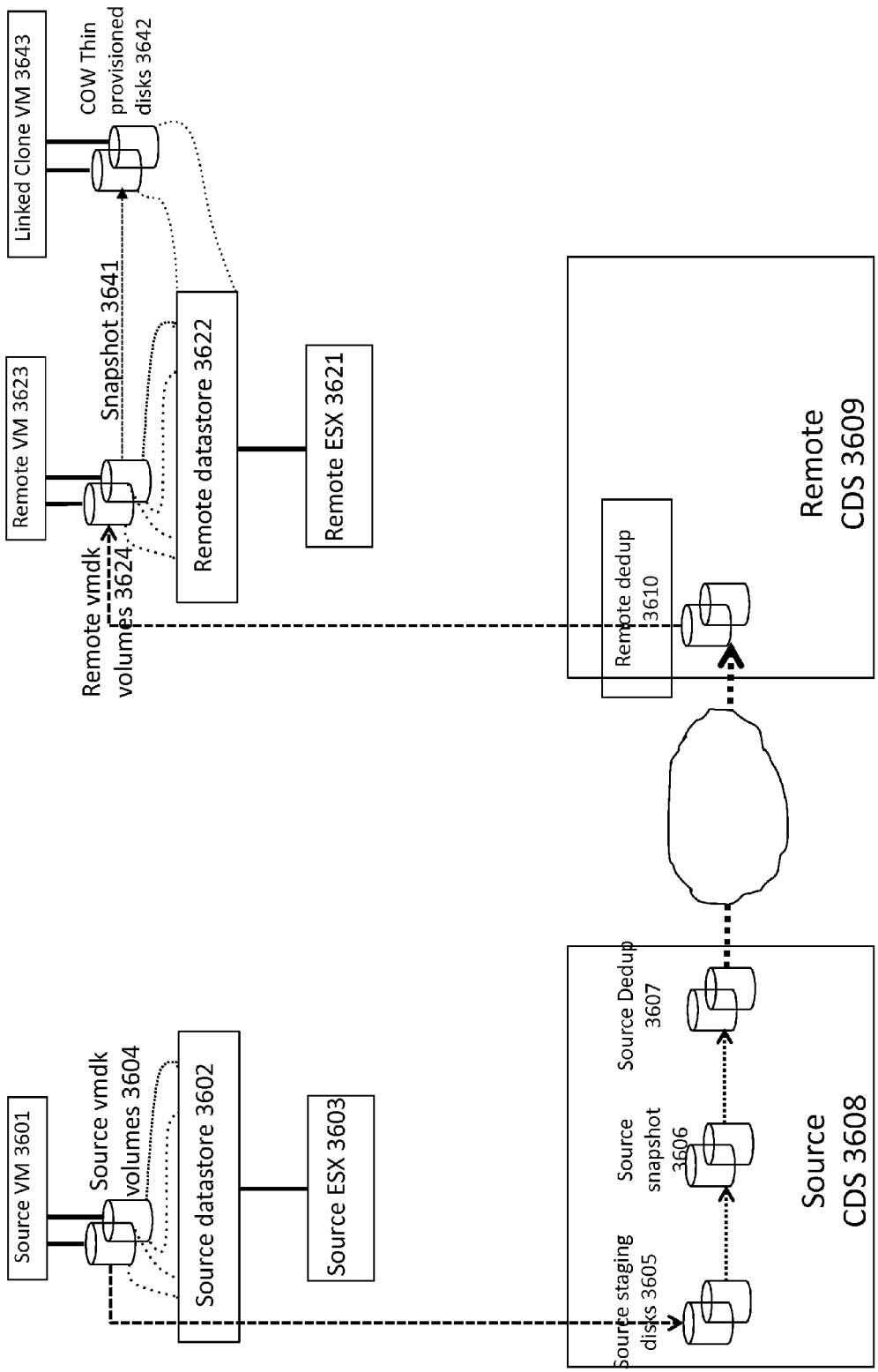
FIG. 4 is an exemplary diagram of a test failover process for a remote virtual machine datastore replication in accordance with some embodiments.

FIG. 4 is an exemplary diagram of the test failover process for a remote virtual machine datastore (e.g., readyvm) replication. In some embodiments, the test failover process can be used to perform a test failover in a VM environment of replicated data.

FIG. 4 includes remote ESX 3621, remote datastore 3622, remote VM 3623, remote vmdk volumes 3624, snapshot 3641, copy on write (COW) thin provisioned disks 3642, and linked clone VM 3643.

Referring to remote ESX 3621, remote ESX 3621 is a virtual hypervisor that manages physical resources such as CPU, memory and storage and provides a virtualization environment for the guest virtual machines to run. It accesses storage from remote datastore 3622 for providing virtual disk access to the virtual machines.

Referring to remote datastore 3622, remote datastore 3622 provides the underlying storage for virtual disk files 3624 of the remote virtual machine 3623. Each virtual machine treats virtual disk files as its disks and accesses them in a similar way as a physical servers accesses physical disks attached to it. ESX server could present files on datastore as virtual disks to the virtual machine or it could present real physical disks directly to a virtual machine as virtual disks. In this example, remote ESX server 3621 presents files on remote datastore 3622 as virtual disks to remote virtual machine 3623.

Referring to remote VM 3623, VM 3623 is a virtual machine that is created before starting replication, with the same configuration as the source virtual machine being replicated. First replication cycle copies the contents of source virtual machine to 3623 and subsequent replication cycles update it with the modifications from the source virtual machine by copying the incremental changes to it.

Referring to remote vmdk volumes 3624, vmdk volumes 3624 are the disks of the remote virtual machine 3623. Though the remote virtual machine treats them as physical disks, they can be virtual disks carved out of files from remote datastore 3622 and presented to remote virtual machine 3623 as virtual disks by the remote ESX host 3621.

Referring to snapshot 3641, snapshot 3641 is a snapshot of remote virtual machine 3623 that captures the point in time image of contents of the virtual machine, without creating a full copy of the remote vmdk volumes 3624. It maintains references to the remote vmdk volumes 3624 and any changes to the remote virtual machine after creating the snapshot 3641 are stored in separate delta files, so snapshot 3641 always reflects the point in time image of remote VM 3623 at the time of creating this snapshot.

Referring to COW Thin provisioned disks 3642, these disks are virtual disks of the newly created linked clone 3643 that are not fully populated by copying all the data from remote vmdk files 3624. Instead they maintain references to the vmdk files 3624. Any blocks of data modified in the linked clone VM 3643 are actually allocated and written to the disks 3642, while non-modified blocks would still point to the base vmdk disks 3624. Any modifications to the remote virtual machine 3623 after creating the snapshot are maintained in separate delta files, so the newer modifications would not affect the contents of the disks 3642 even though they reference the base vmdk disks 3624.

Referring to linked clone VM 3643, this VM is another virtual machine with its own virtual resources that looks very similar to the remote virtual machine 3623 with the only exception that its virtual disks are dependent on base vmdk volumes 3624. This virtual machine can be powered ON and used like any other physical or virtual host as long it is able to access its own virtual disks 3642 and base virtual disks 3624.

Referring to FIG. 4 generally, a new VM snapshot 3641 is created from the remote VM 3623. Since remote VM 3623 always maintains the point in time image of the source VM 3601 at the time of the last replication cycle, the new snapshot 3641 now reflects the last replicated version of source VM 3601. The new VM snapshot 3641 results in creating copy-on-write ("COW") reference virtual disk files 3642. The test failover operation now creates a new linked clone VM 3643 using vmware API under the same remote ESX host 3621. Apart from using CPU and memory resources allotted by the remote ESX host 3621, it uses the snapshot virtual disk files 3642 as its storage. Since the linked clone 3643 is created in a powered off state, test failover operation now automatically powers it ON using another vmware API and it is now booted and ready for logging in to validate the data.

Figure 5:
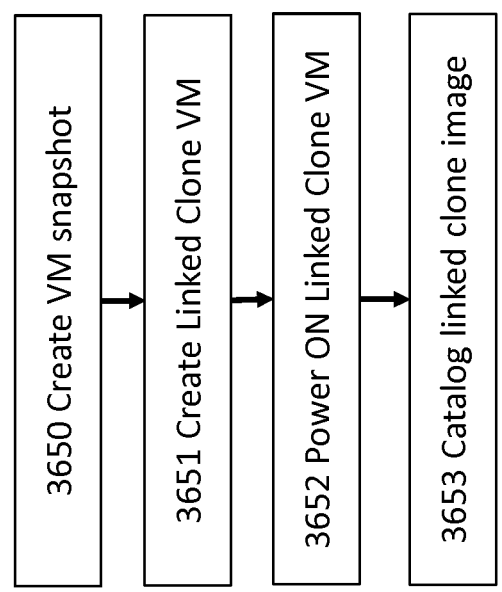
FIG. 5 is an exemplary diagram of a computerized method for a test failover process for a remote virtual machine datastore replication in accordance with some embodiments.

FIG. 5 is an exemplary diagram of a computerized method for a test failover process for a remote virtual machine datastore replication (e.g., ReadyVM) in accordance with some embodiments. In some embodiments, a VM of replicated data exists and the test failover is of the existing VM.

At the start of the test-failover, in step 3650, a new snapshot of the remote Virtual Machine is created. This step results in creating a quick point in time replica of the state of the virtual machine at the time of last successful replication. Any future replication cycles that result in writing new data to the remote virtual machine will not modify the contents of the newly created snapshot. Next, in step 3651, a new linked clone VM is created based off the snapshot created in previous snapshot. The new snapshot is powered on in step 3652 that provides the user with a virtual machine that represents the state of the source virtual machine at the time when last replication was successfully performed. At step 3653 the linked clone VM is cataloged (e.g., to reflect the fact that the VM is created and powered on). For example, the cataloged VM allows the linked clone VM to be shown to a user, used by the CDS, and/or the like. The cataloged VM also facilitates deletion of the linked image when requested by a user.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

We claim:

1. A computerized method of facilitating test failover on a remote virtual machine without creating a full copy of the remote virtual machine, the method comprising:
    transmitting an instruction, by a computing device, to a remote hypervisor to create a snapshot of a remote virtual machine disk, the remote virtual machine disk protecting a source virtual machine disk, wherein protecting the source virtual machine disk comprises:

receiving, by the computing device, data indicative of a full backup of the source virtual machine disk, the source virtual machine disk including data corresponding to a source virtual machine and an associated source virtual machine metadata; and creating from the full backup, by the computing device, a remote virtual machine and the remote virtual machine disk including data from the source virtual machine;

transmitting a second instruction, by the computing device, to the remote hypervisor to create an instant, thin provisioned virtual machine from the snapshot, wherein creating the instant, thin provisioned virtual machine from the snapshot further comprises creating a copy-on-write reference virtual disk from the snapshot, the copy-on-write reference virtual disk including a reference to the remote virtual machine disk; and transmitting a third instruction, by the computing device, to the remote hypervisor to power on the instant, thin provisioned virtual machine based on a received instruction to power on the instant, thin provisioned virtual machine thereby creating a running instance of a virtual machine and facilitating test failover on the remote virtual machine without creating a full copy of the remote virtual machine.

2. The method of claim 1, wherein protecting the source virtual machine disk further comprises updating, by the computing device, the remote virtual machine disk during a subsequent backup to the full backup with deduplicated data, the deduplicated data associated with data corresponding to the source virtual machine disk at a first point time associated with the subsequent backup that is different than data corresponding to the source virtual machine disk at a prior point in time, the prior point in time associated with one of:

the full backup, and an interim backup after the full backup and before the subsequent backup.

3. The method of claim 2, wherein the snapshot comprises a copy of a state of the remote virtual machine disk at a time corresponding to a successful replication associated with one of the full backup, the interim backup, and the subsequent backup.

4. The method of claim 2, further comprising transmitting an instruction, by the computing device, to the remote hypervisor to store modifications made to the remote virtual machine after creating the snapshot to delta files such that the modifications do not affect data stored on the remote virtual machine disks.

5. The method of claim 4, wherein the delta files include references to the remote virtual machine disks.

6. The method of claim 1, further comprising transmitting an instruction, by the computing device, to the remote hypervisor to catalog, by the computing device, an instant, thin provisioned virtual machine image corresponding to the instant, thin provisioned virtual machine when the instant, thin provisioned virtual machine is powered on such that a user or the computing device can identify the instant, thin provisioned virtual machine image.

7. The method of claim 6, further comprising receiving an instruction, by the computing device, to delete data associated with the instant, thin provisioned virtual machine, wherein deleting the data associated with the instant, thin provisioned virtual machine comprises identifying the instant, thin provisioned virtual machine image corresponding to the instant, thin provisioned virtual machine data.

8. The method of claim 1, wherein creating the instant, thin provisioned virtual machine comprises creating instant, thin provisioned virtual machine using an application programming interface.

9. The method of claim 1 further used for disaster recovery.

10. A computing system for facilitating test failover on a remote virtual machine without creating a full copy of the remote virtual machine, the system comprising:

a processor; and a memory coupled to the processor and including computer-readable instructions, that, when executed by the processor, cause the processor to:

transmit an instruction to a remote hypervisor to create a snapshot of a remote virtual machine disk, the remote virtual machine disk protecting a source virtual machine disk, wherein protecting the source virtual machine disk further causes the processor to:

receive data indicative of a full backup of the source virtual machine disk, the source virtual machine disk including data corresponding to a source virtual machine and an associated source virtual machine metadata; and create from the full backup a remote virtual machine and the remote virtual machine disk including data from the source virtual machine;

transmit a second instruction to the remote hypervisor to create an instant, thin provisioned virtual machine from the snapshot, wherein creating the instant, thin provisioned virtual machine from the snapshot further comprises creating a copy-on-write reference virtual disk from the snapshot, the copy-on-write reference virtual disk including a reference to the remote virtual machine disk; and transmit a third instruction to the remote hypervisor to power on the instant, thin provisioned virtual machine based on a received instruction to power on the instant, thin provisioned virtual machine, thereby creating a running instance of a virtual machine and facilitating test failover on the remote virtual machine without creating a full copy of the remote virtual machine.

11. The system of claim 10, wherein protecting the source virtual machine disk further causes the processor to update the remote virtual machine disk during a subsequent backup to the full backup with deduplicated data, the deduplicated data associated with data corresponding to the source virtual machine disk at a first point time associated with the subsequent backup that is different than data corresponding to the source virtual machine disk at a prior point in time, the prior point in time associated with one of:

the full backup, and an interim backup after the full backup and before the subsequent backup.

12. The system of claim 11, wherein the snapshot comprises a copy of a state of the remote virtual machine disk at a time corresponding to a successful replication associated with one of the full backup, the interim backup, and the subsequent backup.

13. The system of claim 11, wherein the processor is further caused to transmit an instruction to the remote hypervisor to store modifications made to the remote virtual machine after creating the snapshot to delta files such that the modifications do not affect data stored on the remote virtual machine disks.

14. The system of claim 13, wherein the delta files include references to the remote virtual machine disks.

15. The system of claim 10, wherein the processor is further caused to transmit an instruction, to the remote hypervisor to catalog an instant, thin provisioned virtual machine image corresponding to the instant, thin provisioned virtual machine when the instant, thin provisioned virtual machine is powered on such that a user or the system can identify the instant, thin provisioned virtual machine image.

16. The system of claim 15, wherein the processor is further caused to receive an instruction, to delete data associated with the instant, thin provisioned virtual machine, wherein deleting the data associated with the instant, thin provisioned virtual machine comprises identifying the instant, thin provisioned virtual machine image corresponding to the instant, thin provisioned virtual machine data.

17. The system of claim 10, wherein creating the instant, thin provisioned virtual machine further causes the processor to create an instant, thin provisioned virtual machine using an application programming interface.

18. The system of claim 10 further used for disaster recovery.

19. A non-transitory computer readable medium having executable instructions operable to cause an apparatus to:
  transmit an instruction to a remote hypervisor to create a snapshot of a remote virtual machine disk, the remote virtual machine disk protecting a source virtual machine disk, wherein protecting the source virtual machine disk further causes the apparatus to:
    receive data indicative of a full backup of the source virtual machine disk, the source virtual machine disk including data corresponding to a source virtual machine and an associated source virtual machine metadata; and
    create from the full backup a remote virtual machine and the remote virtual machine disk including data from the source virtual machine;
  transmit a second instruction to the remote hypervisor to create an instant, thin provisioned virtual machine from the snapshot, wherein creating the instant, thin provisioned virtual machine from the snapshot further comprises creating a copy-on-write reference virtual disk from the snapshot, the copy-on-write reference virtual disk including a reference to the remote virtual machine disk; and
  transmit a third instruction to the remote hypervisor to power on the instant, thin provisioned virtual machine based on a received instruction to power on the instant, thin provisioned virtual machine thereby creating a running instance of a virtual machine and facilitating test failover on the remote virtual machine without creating a full copy of the remote virtual machine.

20. The non-transitory computer readable medium of claim 19, wherein the apparatus is further caused to transmit an instruction, to the remote hypervisor to catalog an instant, thin provisioned virtual machine image corresponding to the instant, thin provisioned virtual machine when the instant, thin provisioned virtual machine is powered on such that a user or the apparatus can identify the instant, thin provisioned virtual machine image.

* * * * *